United States Patent
Nicklin et al.

(10) Patent No.: US 8,245,811 B2
(45) Date of Patent: Aug. 21, 2012

(54) HYBRID STEERING SYSTEM

(75) Inventors: Charles David Nicklin, Sandbach (GB); Gregory Peter Fitton, Stoke on Trent (GB); Richard Frederick George Young, Uttoxeter (GB)

(73) Assignee: JCB Landpower Limited, Rocester, Uttoxeter (GB)

(*) Notice: Subject to any disclaimer, the term of this patent is extended or adjusted under 35 U.S.C. 154(b) by 213 days.

(21) Appl. No.: 12/708,894

(22) Filed: Feb. 19, 2010

(65) Prior Publication Data
US 2010/0212994 A1    Aug. 26, 2010

(30) Foreign Application Priority Data
Feb. 21, 2009 (GB) .................................. 0902988.5

(51) Int. Cl.
*B62D 5/06* (2006.01)
(52) U.S. Cl. ........................................ 180/414; 180/410
(58) Field of Classification Search .......... 180/409–416; 701/23, 41, 42
See application file for complete search history.

(56) References Cited

U.S. PATENT DOCUMENTS

| | | | | |
|---|---|---|---|---|
| 5,373,911 | A * | 12/1994 | Yasui | 180/168 |
| 5,539,397 | A * | 7/1996 | Asanuma et al. | 340/901 |
| 5,828,971 | A * | 10/1998 | Diekhans et al. | 701/41 |
| 6,170,600 | B1 | 1/2001 | Shimizu | |
| 7,142,956 | B2 * | 11/2006 | Heiniger et al. | 701/23 |
| 2005/0288834 | A1 * | 12/2005 | Heiniger et al. | 701/23 |
| 2006/0064216 | A1 * | 3/2006 | Palmer | 701/41 |

FOREIGN PATENT DOCUMENTS
EP    0856453    8/1998

* cited by examiner

*Primary Examiner* — Tony Winner
(74) *Attorney, Agent, or Firm* — Greenlee Sullivan P.C.

(57) ABSTRACT

A steering system for a vehicle comprising a steering control to effect mechanical steering of the vehicle, the steering control being mechanically connected via a mechanical steering train, to at least one steerable ground engaging wheel. A power assistor apparatus is present for power assisting the mechanical steering of the vehicle when the operator operates the steering control. The system includes a hydraulic steering actuator which is operable by an electronically controlled hydraulic steering control valve to effect hydraulic power steering of the vehicle independently of the operation of the steering control. The electronically controlled hydraulic steering control valve is operable in response to signals from an electronic controller, the hydraulic steering actuator being supplied with pressurized hydraulic fluid from a supply valve arrangement. A sensor device detects when the steering control is operated and provides input to the electronic controller, the controller disabling the hydraulic power steering in response.

13 Claims, 10 Drawing Sheets

HYBRID STEERING SYSTEM

CROSS-REFERENCE TO RELATED APPLICATIONS

This application claims priority under 35 USC 119(a)-(d) to United Kingdom Patent Application No. 0902988.5 filed on Feb. 21, 2009, which is incorporated by reference in its entirety herein.

BACKGROUND OF THE INVENTION

This invention relates to a steering system for a vehicle, and more particularly but not exclusively to a steering system for a vehicle which is used both on and off-road, such as for example, a tractor.

Until recently it used to be a legal requirement in the UK, for any vehicle which is capable of high speed, which travels on public roads, to have mechanical steering in which there is a steering control which is mechanically connected via a mechanical steering train to one or more steerable wheels of the vehicle, for safety reasons, so steering capability is not lost at speed, in the event of any power failure.

Tractors are known which are capable of travelling at high road speeds. These provide considerable advantage to e.g. farmers, who are able to move between agricultural work sites quickly, without delaying other road traffic. Hithertofore, these have had mechanical steering systems.

Modern tractors are expected to be able to perform agricultural tasks, such as crop spraying, using automated systems which are required to be more responsive than a mechanical system tends to be. For example only, it is known to control a tractor with hydraulically powered steering, automatically using an electronic controller which determines the tractor's position e.g. using a GPS. The electronic controller may be programmed with a map of a field for example, where the tractor is to perform spraying, so that in automatically guiding the tractor to perform spraying, the tractor can be maintained within the field boundary (or boundary within a field) and any obstacles such as trees, pylons and the like can be navigated around.

Hydraulically powered steering systems provide the required responsiveness for automated steering, but for the reasons set out above, have not been used on tractors which are capable of high on-road speeds.

SUMMARY OF THE INVENTION

According to a first aspect of the invention, a steering system is provided for a vehicle. The system may include a steering control for an operator to effect mechanical steering of the vehicle, the steering control being mechanically connected via a mechanical steering train, to at least one steerable ground engaging wheel. There may be a power assistor apparatus for power assisting the mechanical steering of the vehicle when the operator operates the steering control. The system may include a hydraulic steering actuator which is operated by an electronically controlled hydraulic steering control valve to effect hydraulic power steering of the vehicle independently of the operation of the steering control. The electronically controlled hydraulic steering control valve may be operable in response to signals from an electronic controller, the hydraulic steering actuator being supplied in use, with pressurised hydraulic fluid from a supply valve arrangement, there being a sensor device to sense when the steering control is operated and to provide an input to the electronic controller, the controller disabling the hydraulic power steering in response.

The present invention enables a vehicle to have mechanical steering for on-road use, and more responsive hydraulic steering e.g. for automated off-road use e.g. during working operations.

It will be appreciated that because the steering control is mechanically connected to the steerable wheel, even when hydraulic power steering is effected, the steering control will move in concert with the steering of the steerable wheel. However when an operator operates the steering control, intentionally to assume operator controlled steering, or accidentally e.g. to prevent movement of the steering control, e.g. if the steering control is fouled, hydraulic power steering will immediately be disabled to enable the operator to assume full control. Thus the invention provides not only for mechanical and hydraulic power steering, but provides for default to operator controlled, mechanical steering.

The electronic controller could rely on manual input to effect hydraulic steering, but preferably this operates the electronically controlled hydraulic steering control valve to effect automatically steering by the hydraulic steering actuator, in accordance with stored data and/or signals from an external source. For example only the electronic controller may utilise signals from a GPS automatically to effect steering of the vehicle using the hydraulic steering actuator.

In one arrangement, power assistance for mechanical steering is provided by pressurised hydraulic fluid, but as desired, power assistance could be provided by other mechanical or an electrical device.

Where power assistance is provided by hydraulic fluid, the power assistor apparatus may include one or both of a steering box actuator and an assister actuator to which pressurised hydraulic fluid is provided to assist mechanical steering of the vehicle. Such apparatus are well known for power assisting the mechanical steering of vehicles.

Where the power assistor apparatus includes an assister actuator to assist mechanical steering of the vehicle, the assister actuator may be a separate actuator from the hydraulic steering actuator, or as desired, the assister actuator may be integral with the hydraulic steering actuator, and in the latter case, may be operated hydraulically to assist mechanical steering when mechanical steering is effected, and to effect hydraulic steering when hydraulic steering is effected.

Pressurised hydraulic fluid may be provided to the power assistor apparatus along a feed line from the supply valve arrangement, to assist mechanical steering when the steering control is operated. Thus it will be appreciated that whenever the steering control is operated, the pressure in the feed line will increase. The electronically controlled hydraulic steering control valve when effecting hydraulic steering, may be moved by the controller to a neutral position in which hydraulic power steering is disabled, in response to a rise in pressure in the feed line above a threshold pressure sensed by the sensor device. The supply valve arrangement ensures that there is always an appropriate fluid pressure and flow to effect steering by mechanical or hydraulic steering.

The hydraulic steering actuator may include a first chamber to which pressurised hydraulic fluid is provided by the electronically controlled hydraulic steering control valve to effect hydraulic steering in one steering direction, and a second chamber to which pressurised hydraulic fluid is provided by the electronically controlled hydraulic steering control valve to effect hydraulic steering in an opposite steering direction. The system may includes a switch-over valve arrangement which in a first condition, during mechanical steering using the steering control, connects the first and second chambers, and in a second condition during hydraulic steering, the switch-over valve isolates the first and second chambers from one another.

The switch-over valve arrangement may include an electrically controlled switch-over valve which is operable by the controller to move to the first condition when mechanical steering is effected. Additionally or alternatively, the switch-over valve arrangement may include a fluid pressure controlled valve which is operable to move to the first condition in response to a rise in pressure in the feed line above a threshold pressure which indicates that mechanical steering is effected.

In a preferred arrangement, both pressure controlled and electrically controlled switch-over valves may be provided for extra protection against the hydraulic steering actuator becoming locked during mechanical steering.

According to a second aspect of the invention we provide a steering system for a vehicle, the system including an axle, the axle including a body connected to a main structure of the vehicle, the axle body carrying at each end a hub for a wheel, each of the hubs being pivotally connected to the axle body to effect steering, there being a mechanical steering train from each of the hubs to a steering control whereby the wheels are mechanically connected to the steering control, and the system including a power assistor apparatus to power assist mechanical steering effected by using the steering control, the power assistor apparatus including an assistor actuator which is pivotally connected at each end to either the pair of hubs, or to one of the hubs and to the axle, and the system further including a hydraulic steering actuator which is connected between either the pair of hubs, or to one of the hubs and to the axle, for effecting hydraulic steering of the vehicle, and the system including a supply valve arrangement to supply pressurised hydraulic fluid to the hydraulic power assistor apparatus during mechanical steering and to the hydraulic steering actuator during hydraulic steering.

The system of the second aspect of the invention may have any of the features of the system of the first aspect of the invention. For example, the assister actuator and the hydraulic steering actuator may be separate components from one another, or may be integral and operated hydraulically to assist mechanical steering when mechanical steering is effected, and to effect hydraulic steering when hydraulic steering is effected.

The mechanical steering train may for example only, include a steering box which operates a Pitman arm, the Pitman arm being pivotally connected to a drag link which is pivotally connected to one of the pair of hubs, with there being a connecting rod between the one hub and the other hub of the pair. The connecting rod may be a simple track rod, or may be a piston carrying rod of the hydraulic steering actuator.

According to a third aspect of the invention we provide a method of operating the steering system of the first aspect of the invention, the method including effecting hydraulic power steering of the vehicle by operating the electronically controlled hydraulic steering control valve with the electronic controller, sensing operation of the steering control with the sensing device, and disabling hydraulic power steering in response.

Embodiments of the invention will now be described with reference to the accompanying drawings.

DETAILED DESCRIPTION OF THE INVENTION

Figure 1:
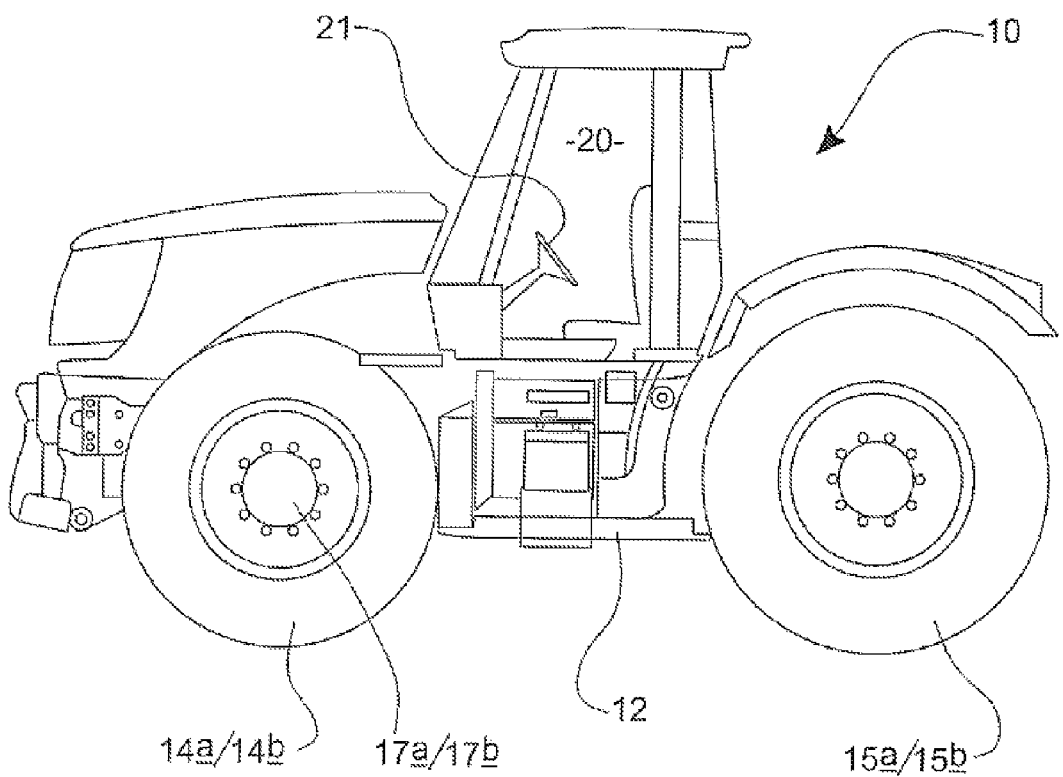
FIG. 1 is an illustrative side view of a vehicle having a steering system in accordance with the present invention.

Referring to FIG. 1 a vehicle 10 is in this example a tractor which includes a main structure 12, carrying, on axles, front 14a, 14b and rear 15a, 15b ground engaging wheels. The axles, or either of the axles may be fixed to the main structure 12 but preferably both are suspended from the main structure 12. At least the front wheels 14a, 14b are steerable and are carried on respective hubs 17a, 17b pivotally mounted on a body of a front axle 18 (see FIG. 3) for pivoting movement about respective generally upright axes A, B respectively. In another example, only the rear wheels 15a, 15b or the front 14a, 14b and rear 15a, 15b wheels may be steerable in different steering modes, but for illustration the invention will be described with reference to a vehicle 10 in which only the front pair 14a, 14b of wheels is steerable.

In yet another example (not shown) the invention could be applied to a vehicle having a single steerable wheel, as desired.

In the present example, the tractor 10 is a high speed tractor which is capable of being driven on-road at speeds of at least up to 40 MPH. In order to provide steering at high speed which for the operator, provides a preferred steering "feel", the tractor 10 is provided with a mechanical steering apparatus by means of which an operator in a cab 20 can effect mechanical steering using a steering control 21 being in the preferred example, a steering wheel.

Figure 2:
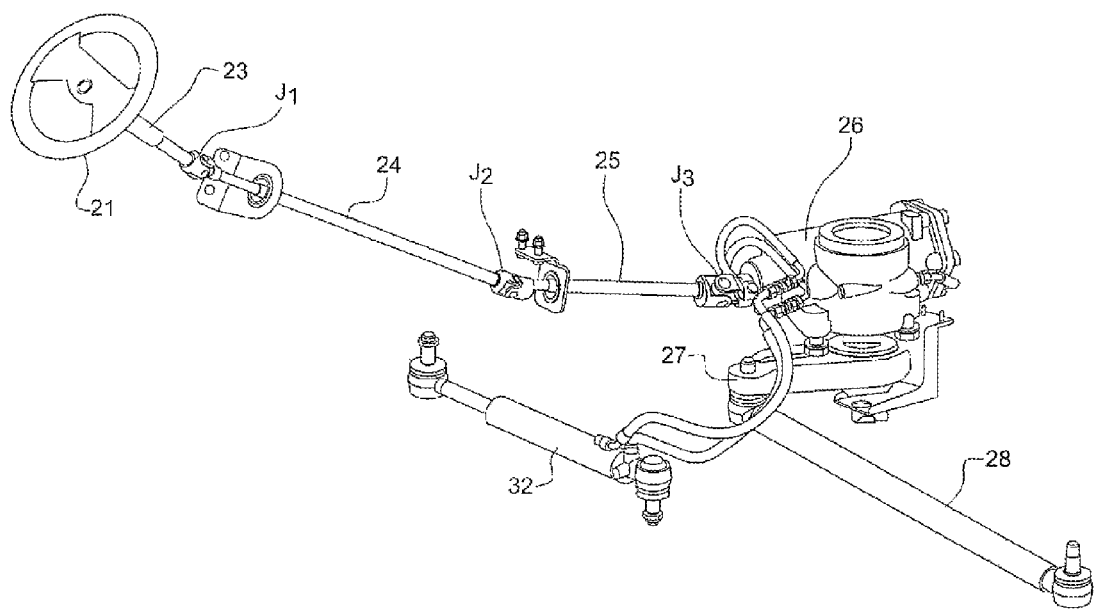
FIG. 2 is an illustrative perspective view of a mechanical steering apparatus of the steering system of the vehicle of FIG. 1.
Figure 3:
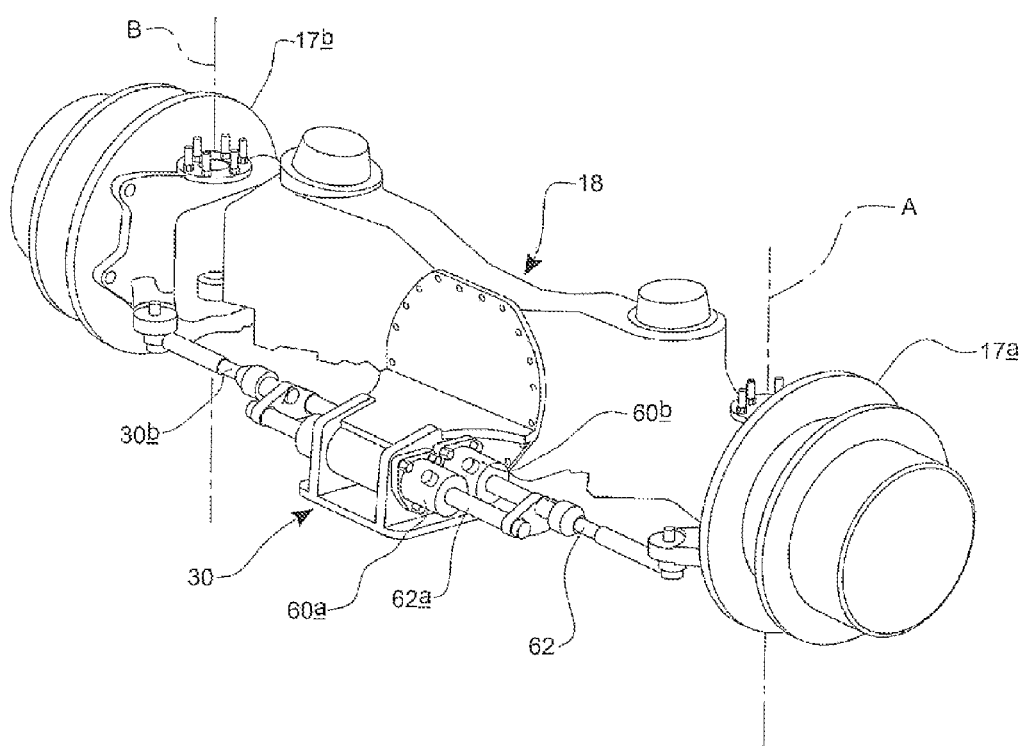
FIG. 3 is an illustrative perspective view of an axle of the vehicle of FIG. 1.

Referring to FIGS. 2 and 3, a mechanical steering apparatus is shown. The apparatus includes a plurality of steering rods 23-25 which mechanically connect the steering wheel 21 to a steering box 26. Between each of the pairs of rods 23, 24 and 24, 25 and the rod 25 to the steering box 26, there is a respective universal joint J1, J2, J3. The particular arrangement depicted is exemplary, but typically a mechanical steering apparatus will include at least one universal joint between the steering wheel 21 and the steering box 26.

The steering box 26 converts, via meshing gear elements, such as a rack and pinion mechanism or another meshing gear element mechanical transmission, the axial rotation of the steering wheel 21 and rods 23-25, to operate a Pitman arm 27 which is pivotally connected to a drag link 28 which is pivotally connected to one of the hubs 17b in the example. The hubs 17a, 17b are mechanically connected by a connecting rod, typically by a track rod, but in this example, as can be seen from FIG. 3, the functionality of the track rod is provided by a piston rod 62 of a hydraulic steering actuator assembly 30 which will be described in more detail below.

Thus rotation of the steering wheel 21 results in pivoting of both of the hubs 17a, 17b on the axle body 18 and hence of steering of the tractor 10, the rods 23-25, joints J1-J3, the steering box 26, Pitman arm 27, drag link 28 and track rod/steering actuator assembly 30 and hubs 17a, 17b providing a mechanical steering train between the steering wheel 21 and the wheels 14a, 14b.

Mechanical steering is power assisted, in the example by hydraulic pressure acting on a piston within the steering box 26 assisting rotation of the steering wheel 21, and the provision of an assister actuator 32 which acts between the axle body 18 and at least one of the hubs 17a, 17b, to act in parallel to the mechanical steering effort.

Figure 4:
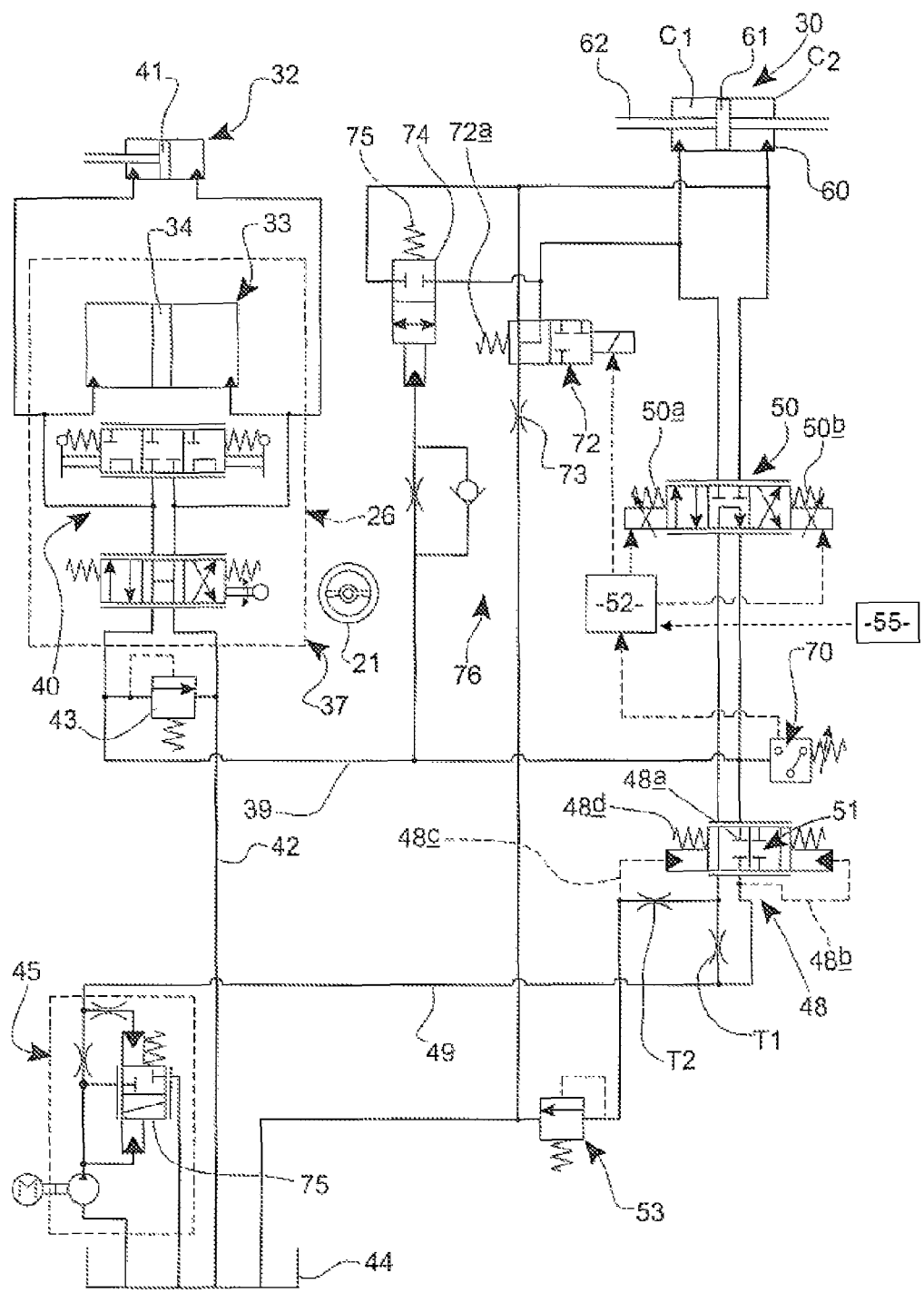
FIG. 4 is an illustrative view of the steering system of the vehicle of FIG. 1.

Referring now to FIG. 4, the hydraulic circuit of the steering system is illustratively shown. Parts which have already been described are appropriately labelled, although the hydraulic steering actuator assembly 30 is shown in FIG. 4 as a single double acting actuator, rather than a parallel pair of single or double acting actuators as indicated in FIG. 3.

The steering box 26 is conventional, and includes, internally, a steering box actuator 33 which includes the piston 34 to which the steering wheel 21 is mechanically connected, and upon which piston 34 hydraulic fluid acts when the steering wheel 21 is moved, to assist mechanical steering.

The piston 34 of the internal steering box actuator 33 is mechanically coupled to the Pitman arm 27 and moves in concert with the steering wheel 21. Movement of the steering wheel 21 also actuates a steering box valve arrangement 40 which is shown diagrammatically in FIG. 4, which according to steering wheel 21 movement and position, provides pressurised hydraulic fluid to the steering box actuator 33 to assist the mechanical steering effort, or returns fluid supplied to the steering box valve arrangement 40 to a low pressure line 42, and hence to a reservoir 44.

Any conventional steering box 26 with a steering box actuator 33, or not, may be provided which provides hydraulic power assistance to the mechanical steering effort when steering wheel 21 is operated.

Referring again to the example shown in FIG. 4, additionally, the steering box valve arrangement 40 provides pressurised hydraulic fluid to a corresponding side of a piston 41 of the assistor actuator 32, to provide further assistance to the mechanical steering effort, when the steering wheel 21 is operated.

The assister actuator 32 and steering box 26 together in the example provide a pressurised hydraulic fluid power assistor apparatus 37 for power assisting the mechanical steering.

Hydraulic fluid is fed to the power assistor apparatus 37 from a feed line 39. Fluid which is not used to assist mechanical steering, is passed by the steering valve arrangement 40 to the low pressure line 42 which leads to a hydraulic fluid reservoir 44 of the tractor 10.

A pressure relief valve 43 is shown in the steering box 26 (but this could be external to the steering box) provided between feed line 39 to the power assistor apparatus 37 and the low pressure line 42, to relieve any excess pressure in feed line 39 if required.

Pressurised hydraulic fluid for the feed line 39 to the power assistor apparatus 37 is provided from a hydraulic pump assembly 45, via a supply valve arrangement 48 which in the example of FIG. 4 includes a pressure operated proportional supply valve 51. In the condition shown, in which no mechanical steering is being effected, the supply valve arrangement 48 connects throttled fluid from a pump line 49 (fluid being throttled by a first throttle T1 of the supply valve arrangement 48) from the pump assembly 45 via an electronically controlled hydraulic steering control valve 50 which is shown in FIG. 4 in a neutral position, to the feed line 39.

The pump pressure in the pump line 49 is transmitted to one side of a spool 48a of the proportional supply valve 51, by a line 48b. Fluid from the pump line 49 is also transmitted to the opposite side of the spool 48a, via a pair of throttles T1 and T2 in a line 48c. A spring 48d assists the throttled flow, to urge the spool 48a to the position shown in the drawing in which the throttled flow from the pump line 49, through the first throttle T1 only, passes to the feed line 39 via the electronically controlled hydraulic steering control valve 50.

When no mechanical steering is being effected, the hydraulic power assistor apparatus 37 passes all fluid fed to it via the feed line 39, to the low pressure line 42, and so any fluid pumped from the pump line 49 simply returns to the reservoir 44.

When mechanical steering is effected by operating the steering wheel 21, the pressure increases in the feed line 39 as the direct path to the low pressure line 42 though the steering valve arrangement 40 increasingly closes and the fluid is provided by the steering valve arrangement 40, to effect hydraulic power assistance. Pressure continues to build in the feed line 39, as necessary to provide power assistance to assist the mechanical steering effort as hereinbefore described.

When mechanical steering is discontinued i.e. the steering wheel 21 is in a neutral position and hydraulic fluid is not required for power assisting the mechanical steering effort, the steering valve arrangement 40 again passes more fluid from the feed line, direct to the low pressure line 42.

When no steering is being effected, mechanically or hydraulically as described below, the pressure balance of the supply valve arrangement 48 will maintain the spool 48a in the position shown in FIG. 4.

The electronically controlled hydraulic steering control valve 50 is controlled by an electronic controller 52, to effect hydraulic power steering provided that there is no requirement for pressured fluid to assist mechanical steering.

In the example, the electronic controller 52 provides for automated steering of the vehicle so that the vehicle 10 can be steered without the use of the steering wheel 21 or other steering control.

The hydraulic steering actuator assembly 30 includes a cylinder 60, (or alternatively as depicted in FIG. 3 a pair of cylinders 60a, 60b), which is fixed relative to the axle body 18 of the vehicle 10. A piston 61 inside the (or each) cylinder 60 is moveable by pressurised hydraulic fluid applied at a chamber C1 or C2, of one or other piston 61 side, depending upon the operation of the electronically controlled hydraulic steering control valve 50. The piston 61 is connected via a piston rod 62 (or pistons are connected via rods 62, 62a in the version depicted in FIG. 3) to each of the hubs 17a, 17b where the piston rod 62 is pivotally mounted to the respective hub 17a, 17b. Thus the hydraulic actuator assembly 30 provides a powered track rod connection between the hubs 17a, 17b.

The electronically controlled hydraulic steering control valve 50 receives signals from the electronic controller 52 which in the examples utilizes external GPS input 55 so that the controller 52 knows the position of the vehicle 10 and can thus steer the vehicle appropriately within the boundary of a field or boundary within a field to perform automatically work operations, such as for example only, crop spraying. Data relating to the field or other boundary of operation, including the positions of obstacles such as trees and pylons, can be inputted to the controller 52 so that during automatic steering these obstacles can be avoided.

It will be appreciated that during automatic steering using the hydraulic steering actuator assembly 30, the hubs 17a, 17b will be moved, and due to the mechanical connection between the steering wheel 21 and the wheels 14a, 14b, the steering wheel 21 will move as will the piston 41 of the assister actuator 32 and the piston 34 within the steering box actuator 33. However provided the steering box valve arrangement 40 remains in its neutral position shown in FIG. 4, there will be no resistance to hydraulic power steering by the mechanical steering components. Fluid returning from the hydraulic steering actuator assembly 30, may pass from the electronically controlled hydraulic steering control valve 50 to the reservoir 44 via the feed line 39, the steering box valve arrangement 40 and low pressure line 42.

During hydraulic steering, and while no mechanical steering is being effected, the spool 48a of the supply valve arrangement 48, will remain in the pressure balanced state indicated in FIG. 4.

In the event that the control valve 50 is maintained in a condition supplying pressurised fluid to the hydraulic steering actuator assembly 30 and the piston 61 reaches the end of its travel in the cylinder 60, at the supply valve arrangement 48 (in FIG. 4) the throttled pressure in line 48c at the same side of the spool 48a of the supply valve 51 as the spring 48d will decrease, relative to the pressure in line 48b, thus moving the spool 48a against the spring 48d allowing the supply valve arrangement 48 to direct more fluid proportionally, direct to the feed line 39, and hence to the reservoir 44 via the steering box valve arrangement 40 (which is in its neutral position), to relieve the pressure in the hydraulic steering components 30 and 50.

Alternative supply valve arrangements to that shown in FIG. 4 at 48, may be provided. For example in FIG. 5 there is shown an alternative supply valve arrangement 148 which again is a pressure balanced spring assisted valve 151 and throttles t1, t2, t3 and t4 which are suitably adjusted, in combination with a pilot valve 53 to provide the same functionality as the supply valve arrangement 48 shown in FIG. 4.

Figure 5:
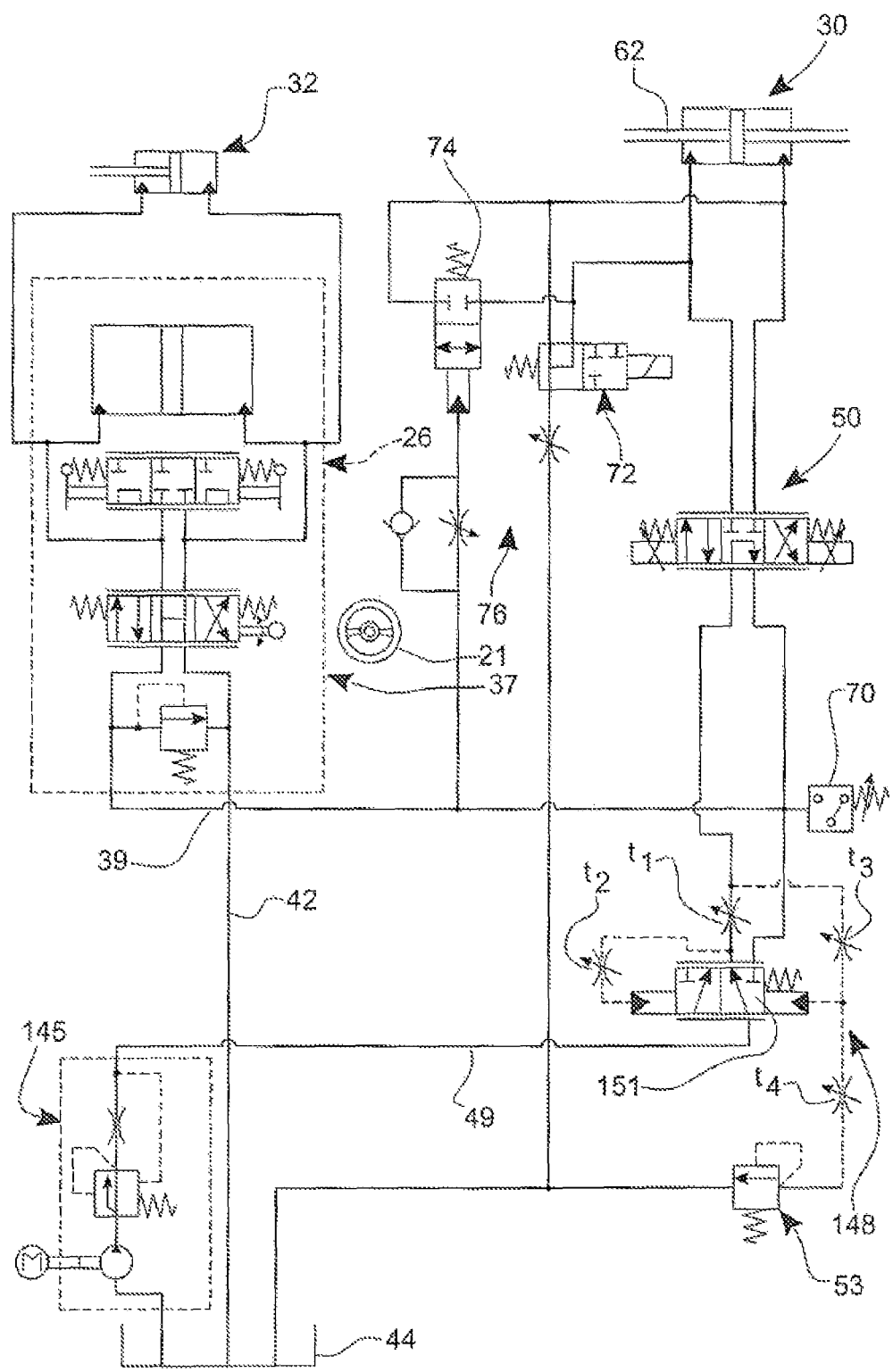
FIG. 5 is a view similar to FIG. 4 but of a first modification.
Figure 5A:
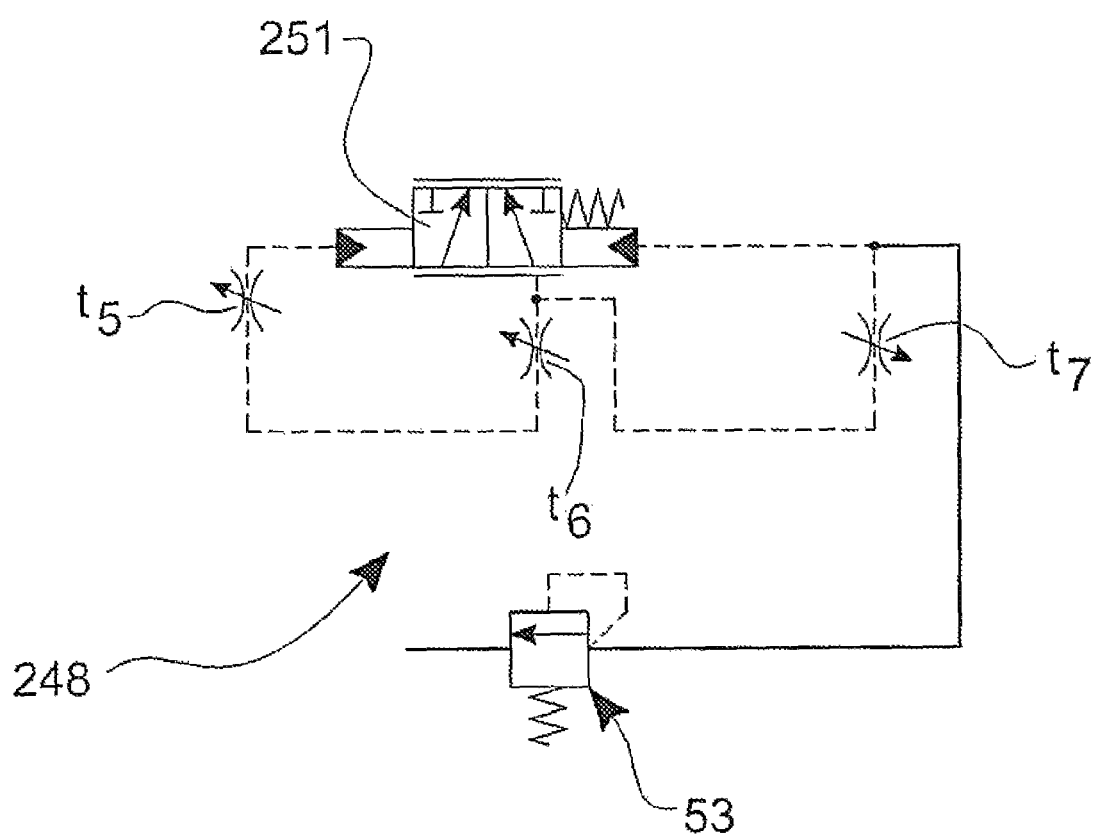
FIG. 5a shows a modification to part of the system shown in FIG. 5.

In FIG. 5a yet another example of a supply valve arrangement is indicated at 248 which again includes a pressure balanced spring assisted valve 251 and throttles t5, t6, t7 which again give the supply valve arrangement 248 the flow sharing functionality already described.

In each case, in the event that the steering wheel 21 is operated e.g. by an operator deliberately deciding to override the automated hydraulic power steering function by turning the steering wheel 21, or in the event that rotation of the steering wheel 21 is inadvertently prevented, for example by a part of the operator fouling the steering wheel 21, the steering system is arranged immediately to revert to mechanical steering.

In the example, there is provided connected to the feed line 39, a pressure sensor device 70 which is a device for detecting when the steering control 21 has been operated. During automated hydraulic powered steering, the pressure in the feed line 39, which is connected to the low pressure line 42, is low. During mechanical steering, when the steering wheel 21 is operated, the pressure in the feed line 39 increases as the direct fluid path to the low pressure line 42 is proportionally closed off. When the pressure in the feed line 39 increases to a threshold, the controller 52 will respond to the signal from the sensor device 70 (the signal from the sensor device 70 may be continuous with the controller 52 determining when the pressure has reached the threshold, or the sensor device 70 may determine when the pressure has reached the threshold and then provide a signal to the controller 52) to return the electronically controlled hydraulic steering control valve 50 to the neutral condition shown in FIG. 4, by releasing any electrical excitation, and permitting a pair of balance springs 50a, 50b of the electronically controlled hydraulic steering control valve 50 to return a spool of the valve 50 to the neutral position.

During mechanical steering, using the steering wheel 21 and steering train, the piston 61 of the hydraulic steering actuator assembly 30 will be mechanically moved as it is connected to the hubs 17a, 17b. To prevent the hydraulic steering actuator assembly 30 providing resistance to mechanical steering, first and second two condition switch-over valves 72/74 of a switch-over valve arrangement 76 are provided.

During mechanical steering, or at least when the automated steering is not actuated i.e. a spool of the electronically controlled hydraulic steering control valve 50 is in the neutral position, and the first switch-over valve 72 will under spring control, connect the two chambers C1, C2 of the hydraulic actuator assembly 30. This is achieved as the electronic controller 52 will provide no actuating (e.g. solenoid exciting) signal to the switch-over valve 72. In this condition, the particular kind of switch-over valve 72 depicted also provides a path for fluid from the hydraulic steering actuator assembly 30 to the reservoir 44 via a throttle 73, should the pressure downstream of the electronically controlled hydraulic steering control valve 50 increase unduly.

The second switch-over valve 74 is a pressure responsive valve, When the pressure in the feed line 39 is low, a spring 75 of the valve 74 will urge a spool thereof to the condition shown in FIG. 4, in which there is no connection through the valve 74 between the chambers C1 and C2 of the hydraulic actuator assembly 30.

When automated steering is being effected, pressure in the feed line 39 will remain low and the second switch-over valve 74 will remain in the condition indicated in FIG. 4, i.e. closing any connection through the valve 74 between the chambers C1 and C2. However during hydraulic steering, the controller 52 provides a signal to the first switch-over valve 72 to excite a solenoid or other electrical actuator thereof, and so the first switch-over valve 72 changes condition, so that the respective chambers C1, C2 at either side of the piston 61 of the hydraulic steering actuator assembly 30 are isolated from each other.

When mechanical steering is effected, the controller 52 ceases to provide a signal to the solenoid of the first switch-over valve 72, which thus reassumes the condition shown in FIG. 4, under the influence of a spring 72a. The increase in pressure in the feed line 39 as the steering box valve arrangement 40 is operated hydraulically to assist mechanical steer, will act against the spring 75 of the second switch-over valve 74 to move the spool thereof to connect the chambers C1 and C2 of the hydraulic actuator assembly 30 through the valve 74.

In the example the first and second switch-over valves 72 and 74 both ensure that during mechanical steering, the hydraulic steering actuator assembly 30 does not lock up to prevent mechanical steering. In another example (not shown) the system may include only one of either the electrically controlled first switch-over valve 72, or pressure responsive second switch-over valve 74, although desirably for maximum safety the switch-over valve arrangement 76 includes both the first and second switch-over valves 72, 74 as shown and described.

The hydraulic fluid pump assembly 45 which supplies pressurised fluid to the supply valve arrangement 48 (or 148 or 248) may be conventional, being a continuously driven pump (from an engine M of the tractor 10 or other power source), with a return valve 75 for returning unrequired pumped fluid, to the reservoir 44. In FIG. 5, a modified pump assembly 145 is shown illustratively in the hydraulic circuit. The controller 52 is omitted from FIG. 5 as are some references.

Figure 5B:
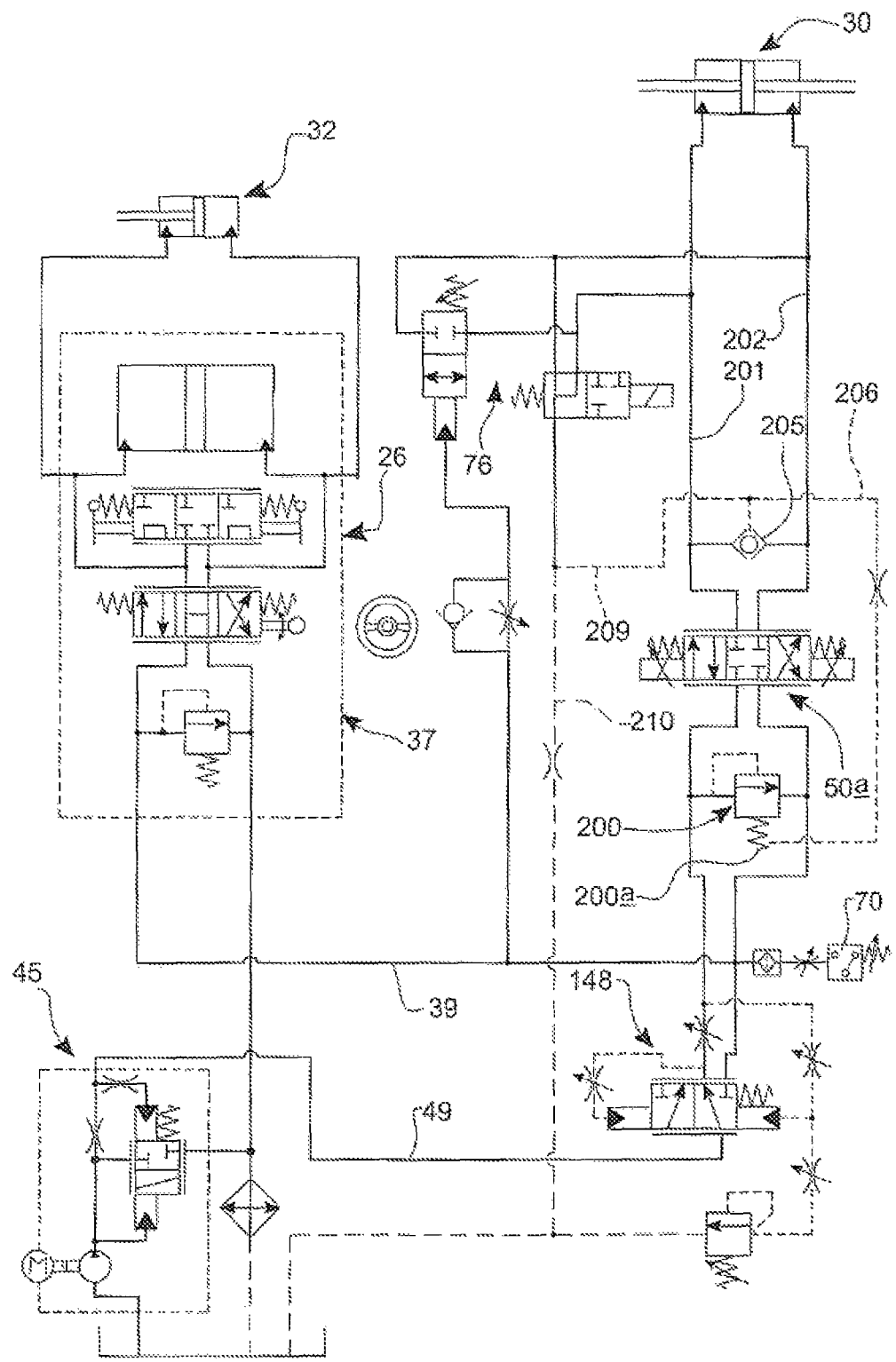
FIG. 5b shows an alternative modification to a part of the system of FIG. 5.

FIG. 5b shows a circuit very similar to that illustrated in FIG. 5, but modified. Similar parts to those of FIG. 5 are indicated by the same references.

In the FIG. 5b version the electronically controlled hydraulic steering control valve 50a does not include a path there through, for pumped fluid from pump line 49 via the supply valve arrangement 148, to the feed line 39. To provide the same functionality as the valve 50 in the FIG. 5 (and FIG. 4) embodiments, there is provided a sequencing valve 200 to permit pumped fluid from the supply valve arrangement 148, at least when the system is not effecting hydraulic steering, to pass to the feed line 39.

The sequencing valve 200 is spring biased by spring 200a to a condition in which fluid cannot pass through the sequencing valve 200, but when the pressure of the pumped fluid is above a threshold, e.g. 10 bar, set by the valve spring 200a pressure, the sequencing valve 200 will open to a degree depending on the pumped pressure, to allow fluid flow through the sequencing valve 200, to the feed line 39.

The pumped fluid from the supply valve arrangement 148 pressure builds, because there is no path for such fluid via the electronically controlled hydraulic steering control valve 50a or otherwise, to a lower pressure region.

When mechanical steering is effected and the pressure in the feed line 39 increases, the condition of the sequencing valve 200 should not change as its degree of opening is contingent upon the pumped pressure. However as the pumped fluid flow changes in response to operation of mechanical steering, the sequencing valve 200 may be opened or closed more as appropriate.

When hydraulic steering is effected and the electrically controlled hydraulic steering valve 50a is moved by the controller (52—not shown in FIG. 5b) pressure will build in either of pair of lines 201, 202 between the hydraulic steering actuator assembly 30 and the electronically controlled hydraulic steering valve 50a, depending on the direction of movement of the spool of the steering valve 50a.

Between the two lines 201, 202 between the actuator assembly 30 and the steering valve 50a, there is a shuttle valve 205. When hydraulic steering is effected, a valve member of the shuttle valve 205 will be moved by pressure in a respective line 201, 202 in each case to allow pressurised fluid to pass into a line 206 which communicates with a pressure chamber, to support the spring 200a of the sequencing valve 200, and thus the sequencing valve 200 will close, so that the full hydraulic pump pressure is available to operate the hydraulic steering actuator assembly 30. Fluid which is displaced from the hydraulic steering actuator assembly 30 passes via the steering valve 50a to the feed line 39 and hence to the reservoir 44.

Figure 6:
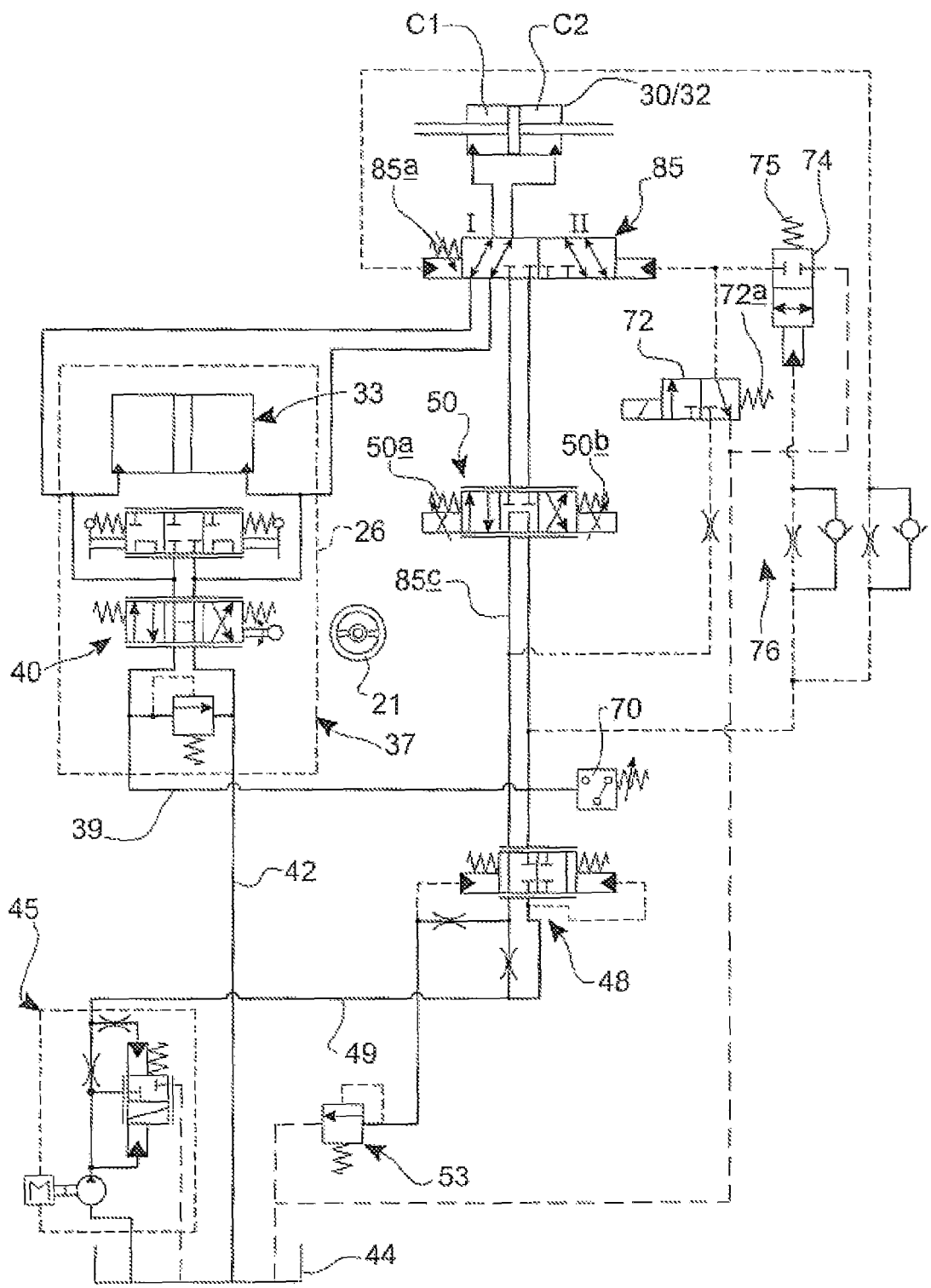
FIG. 6 is another view similar to FIG. 4 but of an alternative modification.

In FIG. 6 again a similar steering system to that shown in FIG. 4 is shown with similar parts indicated by the same references. In FIG. 6 though, the functions of the assister actuator 32 and the hydraulic steering actuator assembly 30 which in the previous proposals are separate components, have been combined and a single actuator labelled 30/32 is indicated which performs both these functions.

The circuit includes still first and second switch-over valves 72, 74 which operate substantially similarly to the switch-over valve arrangement 76 of FIG. 4, although the first electrically controlled switch-over valve 72 is modified as will be explained below.

A control valve 85 is provided to which the respective chambers C1, C2 of the single actuator 30/32 are connected. The control valve 85 has alternative operational positions between which a spool of the control valve 85 is moved, in the example by differential fluid pressures.

In one operational position I, during mechanical steering, to which position I the spool of the control valve 85 is biased by a spring 85a, the control valve 85 directs fluid from the steering box 26 (which fluid in FIG. 4 would have been directed to the assister actuator 32), during mechanical steering to the single actuator 30/32 which thus provides hydraulic power assistance to the mechanical steering effort. The control valve 85 is maintained in this operational position I by the spring 85a.

In its second operational position II, during hydraulic steering, the spool of the control valve 85 is moved against the force of the spring 85a by high pressure fluid in a line 85c between the supply valve arrangement 48 and the electronically controlled hydraulic steering control valve 50, developed as the electronically controlled hydraulic steering control valve 50 is moved from its neutral position. The high fluid pressure acts to the opposite spool side of the control valve 85 to that at which the control valve spring 85a acts. The first switch-over valve 72 is still a two position electrically controlled valve, and during hydraulic steering is moved by the controller (not shown in FIG. 6) to the opposite position to that shown in FIG. 6, when the fluid from the line 85c can pass through the first switch-over valve 72 to act on the spool of the control valve 85 against the spring 85a.

In the position shown in FIG. 6, during mechanical steer, or at least when hydraulic steering is not effected, a spring 72a moves a spool of the first switch-over valve 72 to relieve pressure which otherwise would act on the spool of control valve 85 against the spring 85a, to permit the control valve 85 to revert to operational position I under the action of spring 85a.

The second switch-over valve 74 is spring closed in the absence of a pressure in feed line 39 during mechanical steering, and whenever mechanical steering is effected, the second switch-over valve 74 opens, to relieve pressure in line 85c which otherwise could prevent the control valve 85 reverting to its first operational position I e.g. if the electronically controlled first switch-over valve 72 malfunctioned.

Thus the control valve 85 isolates the single actuator 30/32 from the steering box 26 fluid during hydraulic steering, and fluid is directed from the electronically controlled hydraulic steering control valve 50 to the combined single actuator 30/32 to effect hydraulic power steering.

Figure 7:
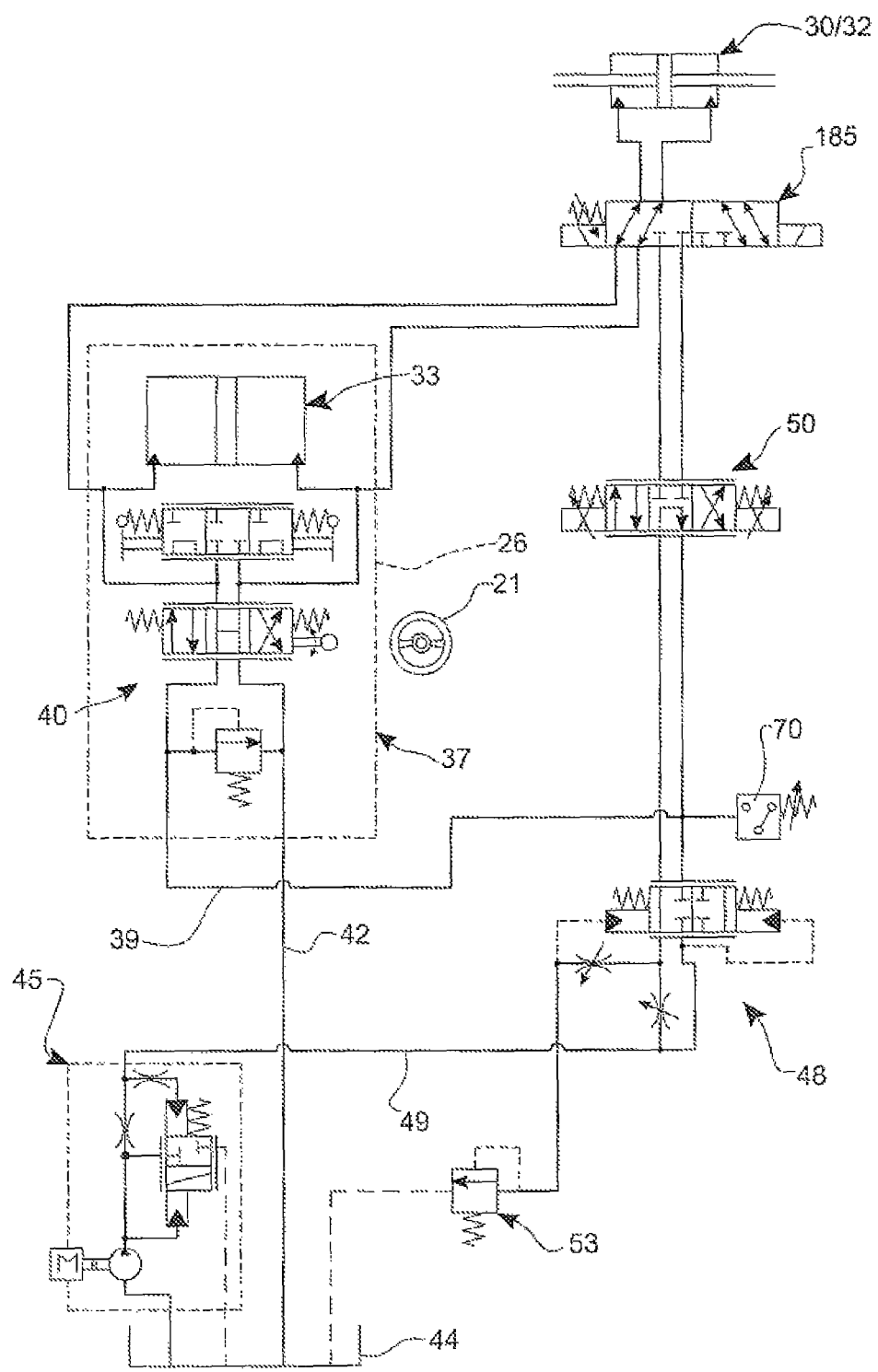
FIG. 7 is yet another view similar to FIG. 4 but of a yet further modification.
Figure 7A:
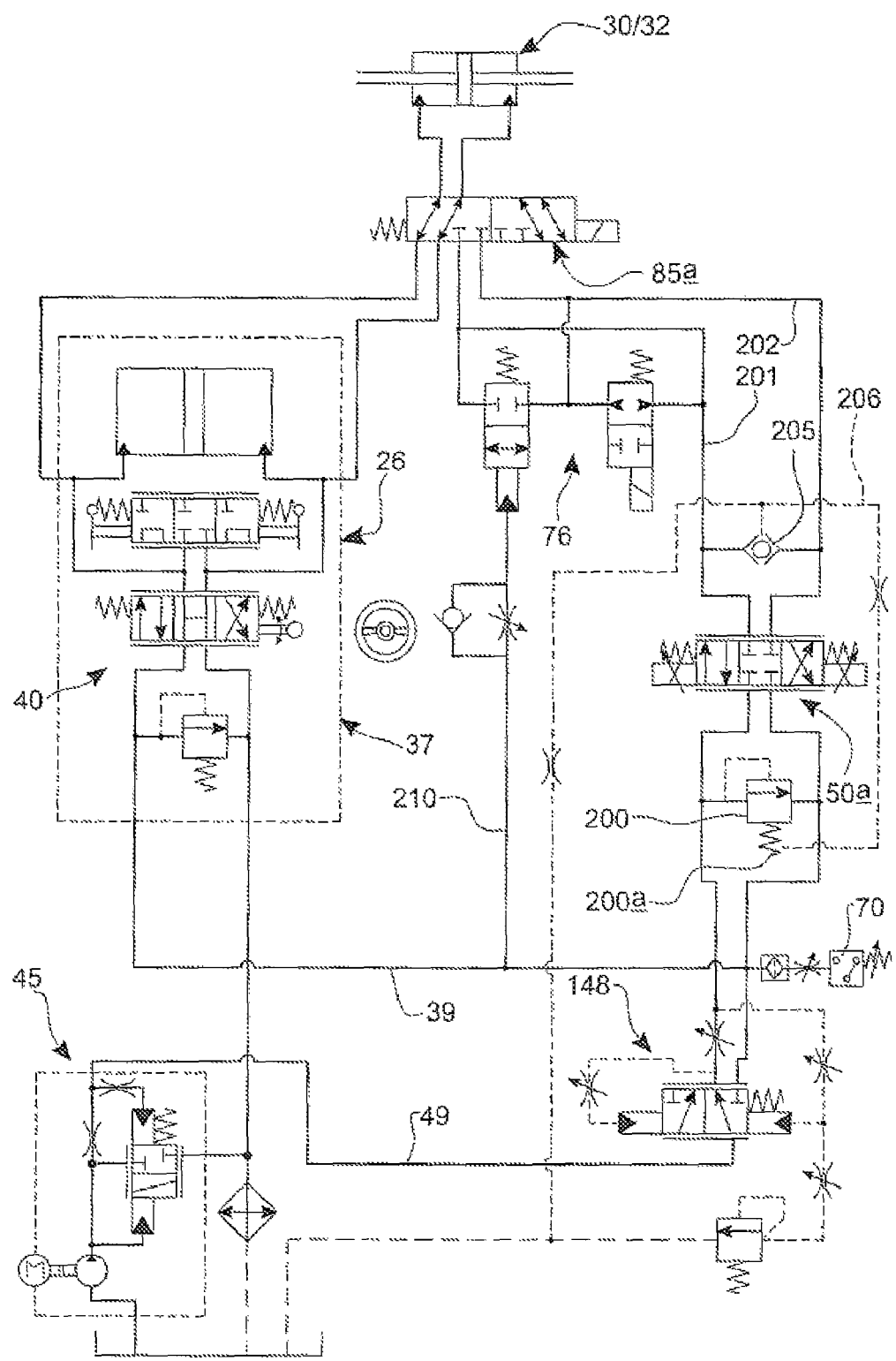
FIG. 7a shows a modification of the embodiment of FIG. 6.

In FIG. 7a there is shown a system similar to that shown in FIG. 6 in that there is a combined hydraulic steering actuator 30 and assistor actuator 32, single actuator 30/32 for use in mechanical and hydraulic steering, and a control valve 85a for connecting chambers C1 and C2 of the single actuator 30/32 alternatively to the mechanical steering box 26 or the electronically controlled hydraulic control valve 50a which is of the same construction as the corresponding control valve 50a of the FIG. 5b embodiment.

In this embodiment the steering control valve 85a is electronically operated by the controller (52—not shown in FIG. 6a) rather than being operated by differential fluid pressure as in FIG. 6. As with the FIG. 5b embodiment, a shuttle valve 205 is provided which is opened by pumped fluid pressure acting against the spring 205a, and closed when the electronically controlled hydraulic control valve 85a is operated to effect hydraulic steering.

In FIG. 7, an arrangement which utilises, for a combined hydraulic steering actuator 30 and assister actuator 32, an electrically operated rather than fluid responsive control valve 185 is shown (the controller 52 which controls the control valve 185 is again omitted). With this arrangement, no switch-over valve arrangement 76 is required.

Many other modifications are possible without departing from the scope of the invention.

In the examples described power assistance for the mechanical steering effort is provided using a conventional type of steering box 26, and an assistor actuator 32 (or 30/32). In another embodiment, power assistance during mechanical steering may be provided by some other means, for example an electrical device to assist mechanical steering. In this event, there would be no requirement for a feed line for pressurised hydraulic fluid to the steering box 26 during mechanical steering, and consequently mechanical steering may not be sensed by a hydraulic pressure sensing device as shown at 70.

Rather an alternative sensor device to sense when the steering wheel 21 is operated (i.e. turned or prevented from turning) in order to provide and input to the controller 52 to disable the hydraulic steering, would be required. This may sense physical movement of a component used for mechanical steering, and/or for example a pressure in the hydraulic steering circuit which changes as a result of the steering wheel 21 operation.

Although the invention has been described with reference to a vehicle which is a tractor 10 which is automatically steerable within the boundary of a field or within a field, the invention may be applied to any other vehicle, typically a vehicle which is used both on-road and off-road. For example the invention may be applied to a vehicle or machine which is used off-road for load handling and or earth moving, e.g. in an agricultural, construction or industrial environment. Such a vehicle, or any other vehicle incorporating the invention, may be automatically steered e.g. using GPS signals and/or stored data, or otherwise steered using hydraulic steering when mechanical steering is not effected.

Having now fully described the present invention in some detail by way of illustration and examples for purposes of clarity of understanding, it will be obvious to one of ordinary skill in the art that the same can be performed by modifying or changing the invention within a wide and equivalent range of conditions and other parameters without resort to undue experimentation without affecting the scope of the invention or any specific embodiment thereof, and that such modifications or changes are intended to be encompassed within the scope of the appended claims. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

All references cited herein are hereby incorporated by reference in their entirety to the extent that there is no inconsistency with the disclosure of this specification. All headings used herein are for convenience only.

The invention claimed is:

1. A steering system for a vehicle, the system including a steering control for an operator to effect mechanical steering of the vehicle, the steering control being mechanically connected via a mechanical steering train, to at least one steerable ground engaging wheel, there being a power assistor apparatus for power assisting the mechanical steering of the vehicle when the operator operates the steering control, and the system including a hydraulic steering actuator which is operated by an electronically controlled hydraulic steering control valve to effect hydraulic power steering of the vehicle independently of the operation of the steering control, the electronically controlled hydraulic steering control valve being operable in response to signals from an electronic controller, the hydraulic steering actuator being supplied in use, with a pressurized hydraulic fluid from a supply valve arrangement, there being a sensor device to sense when the steering control is operated and to provide an input to the electronic controller, the controller disabling the hydraulic power steering in response.

2. A system according to claim 1 wherein the electronic controller operates the electronically controlled hydraulic steering control valve to effect automatically steering by the hydraulic steering actuator, in accordance with stored data and/or signals from an external source.

3. A system according to claim 2 wherein the electronic controller utilizes signals from a GPS automatically to effect steering of the vehicle using the hydraulic steering actuator.

4. A system according to claim 1 wherein the power assistor apparatus includes one or both of a steering box actuator and an assister actuator to which pressurized hydraulic fluid is provided to assist mechanical steering of the vehicle.

5. A system according to claim 4 wherein the power assistor apparatus includes an assister actuator to assist mechanical steering of the vehicle, the assister actuator being integral with the hydraulic steering actuator, and being operated hydraulically to assist mechanical steering when mechanical steering is effected, and to effect hydraulic steering when hydraulic steering is effected.

6. A system according to claim 1 wherein the electronically controlled hydraulic steering control valve when effecting hydraulic steering, is moved by the controller to a neutral position in which hydraulic power steering is disabled, in response to a rise in pressure in a feed line above a threshold pressure sensed by the sensor device.

7. A system according to claim 1 wherein the hydraulic steering actuator includes a first chamber to which pressurized hydraulic fluid is provided by the electronically controlled hydraulic steering control valve to effect hydraulic steering in one steering direction, and a second chamber to which pressurized hydraulic fluid is provided by the electronically controlled hydraulic steering control valve to effect hydraulic steering in an opposite steering direction, and the system includes a switch-over valve arrangement which in a first condition, during mechanical steering using the steering control, connects the first and second chambers, and in a second condition during hydraulic steering, the switch-over valve isolates the first and second chambers from one another.

8. A steering system for a vehicle, the system including an axle, the axle including a body connected to a main structure of the vehicle, the axle body carrying at each end a hub for a wheel, each of the hubs being pivotally connected to the axle body to effect steering, there being a mechanical steering train from each of the hubs to a steering control whereby the wheels are mechanically connected to the steering control, and the system including a power assistor apparatus to power assist a mechanical steering train effected by using the steering control, the power assistor apparatus including an assistor actuator which is pivotally connected at each end to either the pair of hubs, or to one of the hubs and to the axle, and the system further including a hydraulic steering actuator which is connected between either the pair of hubs, or to one of the hubs and to the axle, for effecting hydraulic steering of the vehicle, and the system including a supply valve arrangement to supply a pressurized hydraulic fluid to the hydraulic power assistor apparatus during mechanical steering and to the hydraulic steering actuator during hydraulic steering.

9. A system according to claim 8 wherein the assister actuator and the hydraulic steering actuator are separate components from one another.

10. A system according to claim 8 wherein the assister actuator and the hydraulic steering actuator are integral and operated hydraulically to assist mechanical steering when mechanical steering is effected, and to effect hydraulic steering when hydraulic steering is effected.

11. A system according to claim 8 wherein the mechanical steering train includes a steering box which operates a Pitman arm, the Pitman arm being pivotally connected to a drag link which is pivotally connected to one of the pair of hubs, with there being a connecting rod between the one hub and the other hub of the pair.

12. A system according to claim 11 wherein the connecting rod is one of a track rod and a piston carrying rod of the hydraulic steering actuator.

13. A method of operating a steering system, wherein the steering system comprises a steering control for an operator to effect mechanical steering of the vehicle, the steering control being mechanically connected via a mechanical steering train, to at least one steerable ground engaging wheel, there being a power assistor apparatus for power assisting the mechanical steering of the vehicle when the operator operates the steering control, and the system including a hydraulic steering actuator which is operated by an electronically controlled hydraulic steering control valve to effect hydraulic power steering of the vehicle independently of the operation of the steering control, the electronically controlled hydraulic steering control valve being operable in response to signals from an electronic controller, the hydraulic steering actuator being supplied in use, with a pressurized hydraulic fluid from a supply valve arrangement, and there being a sensor device to sense when the steering control is operated and to provide an input to the electronic controller, wherein the method comprises the steps of: a) effecting hydraulic power steering of the vehicle by operating the electronically controlled hydraulic steering control valve with the electronic controller, b) sensing operation of the steering control with the sensor device, and c) disabling hydraulic power steering in response to the signal from the sensor device which indicates that the steering control has been operated.

* * * * *